US005862276A

United States Patent [19]
Karras

[11] Patent Number: 5,862,276
[45] Date of Patent: Jan. 19, 1999

[54] PLANAR MICROPHOTONIC CIRCUITS

[75] Inventor: Thomas William Karras, Berwyn, Pa.

[73] Assignee: Lockheed Martin Corp., Sunnyvale, Calif.

[21] Appl. No.: 901,621

[22] Filed: Jul. 28, 1997

[51] Int. Cl.$^6$ ..................................... G02B 6/26
[52] U.S. Cl. ................... 385/30; 385/9; 385/40; 385/50
[58] Field of Search ................... 385/9, 16, 22, 385/27, 30, 40, 41, 42, 50, 51

[56] References Cited

U.S. PATENT DOCUMENTS

| | | | |
|---|---|---|---|
| 3,781,081 | 12/1973 | Rokos | 385/40 |
| 4,240,693 | 12/1980 | Johnson et al. | 385/18 |
| 5,173,956 | 12/1992 | Hayes | 385/16 |
| 5,367,585 | 11/1994 | Ghezzo et al. | 385/23 |

OTHER PUBLICATIONS

"In–Line Optical Fibre Modulators Without Interruption of the Fiber", by W. Johnstone et al., publ. at pp. 259–262 of Society of Photooptic Instrumentation Engineers (SPIE) in vol. 1580, Fiber Optic Components and Reliability, 1991.

"An Optical Fibre Switch Using Electro–Optic Waveguide Interlays" by McCallion et al., publ. in SPIE vol.1580, Fiber Optic Components & Reliability, 1991. pp. 263–267.

"Polymers for Integrated Optical Waveguides", by Bruce L. Booth, publ. in Polymers for Electronic and Photonic Applications, 1993 Bell Labs, ISBN 0–12–762540–2.

"Nonlinear Optical Studies of Single Crystal Films of N–(4–Nitrophenyl)–L–Prolinol" by Quintero–Torres et al., publ. at pp. 1994–1996 of Appl. Phys. Lett. 69(14), Sep. 30, 1996.

"Measurement of Electro–Optic Effects in Single Crystal Films of N–(4–Nitrophenyl)–L–Prolinol", by Xu et al, published at pp. 1197–1198 of Appl. Phys. Lett., vol. 69, 26 Aug. 1996.

*Primary Examiner*—John D. Lee
*Assistant Examiner*—Juliana K. Kang
*Attorney, Agent, or Firm*—W. H. Meise; S. A. Young

[57] ABSTRACT

A microphotonic circuit includes one or more light control elements such as modulators or switches coupled in polymer waveguides, and controlled by electrical bias fields produced by voltage or light sources. Each modulator or switch includes at least one polymer waveguide having a high-$\eta$ core and surrounding low-$\eta$ cladding, to constrain the light. An electrooptic control element is evanescently coupled to the core of the first waveguide by spacing from the core. The coupling between the core and the control element depends upon the relative $\eta$s of the core, cladding and electrooptic element. Bias is applied to maintain the electrooptic element in one of at least two possible states, one of which prevents coupling between the electrooptic element and the core, and the other of which permits such coupling. The bias may be applied in the form of electrical voltage or light. In some embodiments of the invention, a second optical waveguide is coupled to the electrooptic element. The coupling of the second waveguide may be evanescent or direct.

15 Claims, 7 Drawing Sheets

PLANAR MICROPHOTONIC CIRCUITS

FIELD OF THE INVENTION

This invention relates to optical control circuits, and more particularly to optical control circuits using electooptic materials which change index of refraction in response to electric fields.

BACKGROUND OF THE INVENTION

The importance of photolithography to the fabrication of microelectronic circuits is well known, and is exemplified by computer microprocessors, which at the current state of the art may contain millions of individual transistor control elements fabricated with submicron tolerances. The advent of photolithographic techniques has made possible mass production of such microprocessors and other types of circuits, which have revolutionized the computing and signal processing arts. The importance of the commercial mass production of such controllers cannot be overestimated, as sophisticated electronic control of everything from cameras and televisions to automobiles and aircraft has made the devices more user friendly and reliable.

It should be understood that a very narrow-band optical signal transmitted over optical waveguides can carry very high data rates consistent with high RF bandwidths. Optical control elements have certain advantages over electronic control elements, such as immunity to electromagnetic pulse and radio interference, and, in principle, should be as useful as their electronic counterparts, especially for severe environments and high RF bandwidths. However, optical controls have so far not reached the level of commercial importance enjoyed by the electronic controls. This may be due, in part, to the lack of processes for inexpensive mass production of optical control circuits, or microphotonic circuits.

Improved optical controllers, and improved fabrication methods for such controllers, are desired.

SUMMARY OF THE INVENTION

An optical assembly includes a planar optical polymer first waveguide arrangement for guiding light having a selected linear polarization, and lying within a range of wavelengths. The first waveguide arrangement includes an optical core having an index of refraction lying within a first range. At least one planar control element is evanescently coupled to the core of the first waveguide arrangement, for, in a first state, exhibiting an index of refraction which lies in a range which is less than the range of index of refraction of the core, and for, in a second state, exhibiting an index of refraction which lies in a range which is equal to or higher than the index of refraction of the core. The control element is made from an electrooptic material which has an index of refraction which is responsive to the amplitude of electric fields traversing the control element. A planar optical polymer second waveguide arrangement is coupled to the control element, for leading out that portion of an optical signal which passes from the first optical waveguide arrangement into (or through) the control element. The optical assembly also includes an electric field generator coupled to the control element, for generating, within the control element, an electric field parallel with the selected polarization. The magnitude of the electric field generated by the electric field generator is selected to place the control element in at least one of the first and second states. In the first state of the material of the control element, optical signal in the first waveguide arrangement remains largely in the first waveguide arrangement, and in the second state of the material of the control element, at least some of the optical signal flowing in the first waveguide arrangement is coupled to the second waveguide arrangement.

In one embodiment of the invention, the second waveguide arrangement is evanescently coupled to the control element. The first and second waveguide arrangements are preferably polarization-maintaining waveguide arrangements, each operating in single-mode fashion. In another embodiment of the invention, the electric field generator comprises first and second transparent, electrically conducting electrodes in electrical contact with different portions of the control element, together with a source of bias voltage and a coupler coupled to the source of bias voltage and to the first and second transparent, electrically conducting electrodes, for applying the bias voltage across the first and second electrodes. This results in a bias electric field which extends between the first and second electrodes. The transparent, electrically conducting electrodes may be of indium tin oxide. The coupler may include opaque electrically conducting material, which may be of gold or gold alloy.

In another embodiment of the invention, the electric field generator includes a source of bias light, and the second waveguide arrangement is coupled to the source of light. The second waveguide arrangement is directly coupled to the control element, for coupling bias light to the control element, for thereby establishing the electric field. In this embodiment, the second waveguide arrangement further includes a waveguide portion which is substantially free of electrooptic effects, and a waveguide transition for coupling the waveguide portion of the second waveguide arrangement to the control element in a manner which tends to reduce reflections of light from the control element toward the source of bias light.

In yet another embodiment of the invention, the electric field generator includes a source of bias light, and this embodiment further includes a third waveguide arrangement which is coupled to the source of bias light and is also directly coupled to the control element, for coupling bias light to the control element, for thereby establishing the electric field. This third waveguide arrangement may be substantially free from electrooptic effects, and may be coupled to the control element by a tapered (graded index) transition.

A microchip according to the invention includes a plurality of active devices such as controllable optical switches or amplifiers, in which the input port of one active device is coupled by a planar polymeric optical waveguide to the output port of another active device.

DESCRIPTION OF THE INVENTION

Figure 1:
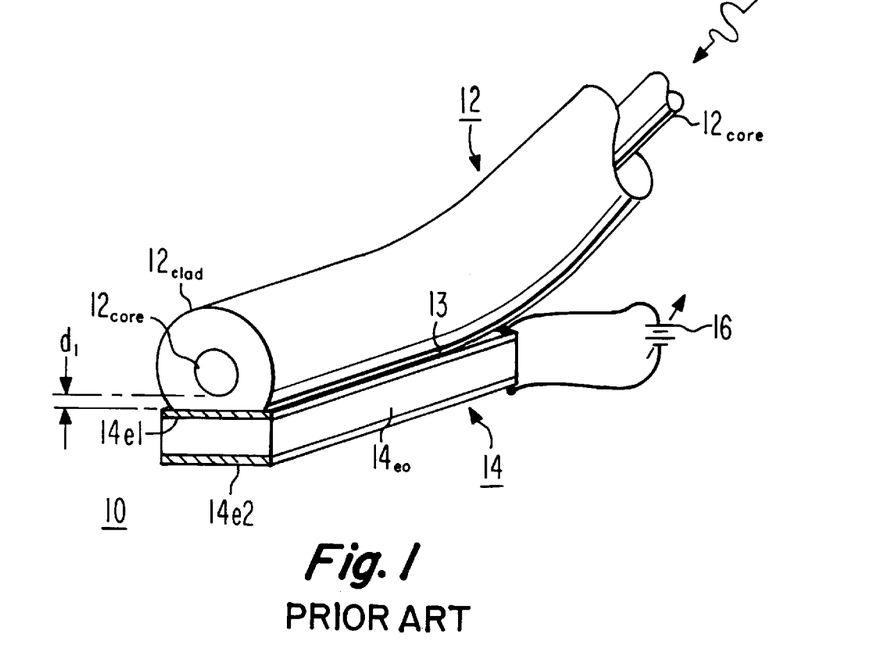
FIG. 1 is a perspective or isometric view of a portion of an optical modulator using an optical fiber and an electrooptic element, partially cut away to reveal construction details.

FIG. 1 illustrates a prior-art optical-fiber modulator 10, such as that described in the article In Line Optical Fibre Modulators Without Interruption of the Fibre, by W. Johnstone et al., published at pp 259–262 of Society of Photooptic Instrumentation Engineers (SPIE) in volume 1580, *Fiber Optic Components and Reliability*, 1991. In FIG. 1, modulator 10 includes an optical fiber 12 having a core $12_{core}$ and a cladding $12_{clad}$. The indices of refraction of the core $12_{core}$ ($\eta_1$) and of the cladding $12_{clad}$ ($\eta_2$) are selected to constrain light propagating, in a manner which tends to prevent loss of light during propagation. As illustrated, optical fiber 12 is bent into a curve. Part of the cladding $12_{clad}$ at the bottom of the curve is removed, as by lapping, to produce a flat surface 13, to which an electrooptic control element is bonded or affixed. Electrooptic element 14 includes an electrooptic slab or core $14_{e0}$, which may be of a material such as $LiNiO_3$. Electrooptic element 14 also has electrodes $14_{e1}$ and $14e2$ attached to its upper and lower surfaces, at least the upper electrode of which is optically transparent. The transparent electrodes may be made as a thin layer of indium-tin oxide (ITO). Electrodes $14_{e1}$ and $14e2$, in turn, are connected to positive and negative poles, respectively, of a direct-voltage source illustrated by a variable battery symbol 16. As illustrated in FIG. 1, the electrooptic control element 14 is spaced away from the core $12_{core}$ of the optical fiber 12 by a distance designated "$d_1$." The distance $d_1$ is selected to be on the order of a few micrometers, and represents the thickness of the remaining clad.

In operation of the arrangement of modulator 10 of FIG. 1, the electrooptic material is selected to have, in a first state, an index of refraction less than that ($\eta_1$) of the core $12_{core}$, and preferably near that ($\eta_2$) of the cladding $12_{clad}$, and in a second state, an index of refraction greater than that of the first state, and preferably near that ($\eta_1$) of the core $12_{core}$. The state of the electrooptic material $14_{e0}$ may be selected by applying a bias voltage from voltage source 16. Alternatively, the state of the slab material $14_{e0}$ of the electrooptic element 14 may be changed by application of a control beam of light of proper amplitude, without need for any electrodes or bias voltage. In the first state, in which the electrooptic control element has a low index of refraction, the effect of the presence of the electrooptic material $14_{e0}$ of control element 14 is minimal, and light propagating through the optical fiber 12 is relatively unaffected. In the second state, in which the index of refraction of the electrooptic material $14_{e0}$ is high, light tends to leak or couple from propagating modes in the core $12_{core}$ of the optical fiber 12 into matching modes of the electrooptic control element 14. Once coupled into the control element 14, the light tends to dissipate or be lost due to losses in, and leakage from, the control element 14. Light can also be lost from the control element 14 by propagating or passing into a waveguide. Thus, the amount of light leaking from the core $12_{core}$ of the optical fiber 12 into the control element 14 is determined by the bias voltage or control light magnitude. The amount of light signal continuing in the core $12_{core}$ of the optical fiber 12 of the light modulator 10 is that remaining after leakage, so the remaining light is also function of the bias. Those skilled in the art know that the electrooptic material and its bias can be selected so that it has index of refraction characteristics which vary in a range between the characteristics in the first and second states. For many applications, a somewhat linear relationship is desirable. The gap defined by distance $d_1$ is selected so that the fringing fields around the core tend to couple into the element; the core is evanescently coupled to the electrooptic material. The described structure is very difficult to fabricate, since it requires lapping, which is difficult to automate. Also, since the lapping may produce a flat surface 13 which is not parallel to the core of the optical fiber, many of the products may as a result not operate properly. Even if the lapping is parallel to the core, the lapping can easily be made too deep, which reduces dimension $d_1$ below the desired value. As a consequence of these difficulties, hand procedures and frequent testing are required during fabrication, and the completed modulators are costly.

Figure 2:
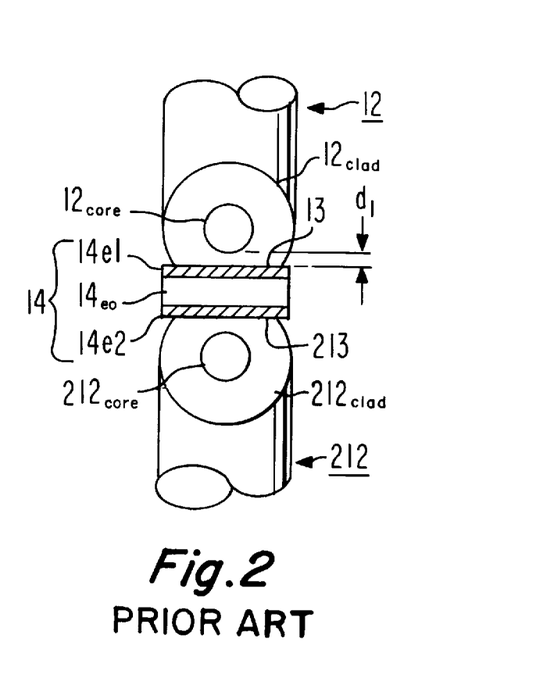
FIG. 2 is a cross-section of an optical switch using two optical fibers and an electrooptic element.

FIG. 2 illustrates a prior-art optical-fiber switch, as described in An Optical Fibre Switch Using Electro-Optic Waveguide Interlays, by McCallion et al, published in SPIE Vol 1580, *Fiber Optic Components and Reliability*, 1991. This structure, which is essentially a combination of two structures such as that of FIG. 1, is even more difficult to fabricate. In FIG. 2, elements corresponding to those of FIG. 1 are designated by like reference numerals, and lower electrode $14e2$ is transparent. In addition to optical fiber 12, the cladding $212_{clad}$ of a further optical fiber 212 is lapped to produce a flat surface 213 spaced by dimension d from the core $212_{core}$. Flat surface 213 is affixed to the lower surface of control element 14. Since the arrangement of FIG. 2 is symmetrical about a horizontal surface passing between electrodes $14_{e1}$ and $14_{e2}$, both optical fibers are evanescently coupled to the control element 14, and so the two optical fibers 12 and 212 are evanescently coupled to each other in a manner which depends upon the index of refraction of the electrooptic material $14_{e0}$. Varying the index of refraction in response to a bias voltage or bias light affects the amount of signal light coupled between optical fiber 12 and optical fiber 212. This coupling is affected by the length of the coupling region and by the wavelength (frequency) of the light being coupled, but within a given frequency range the coupling of light between the two light waveguides may be at least partially controlled by the bias. In regard to the structure of FIG. 2, there is a body of opinion in the art to the effect that the coupling between the first and second waveguides by way of the control element does not result in the flow of light through the control element.

It should be noted that, just as in the case of antennas, the language used to describe couplers such as those of FIGS. 1 and 2 may be misleading to those not skilled in the art. More particularly, the devices are linear reciprocal devices at any given value of bias or signal level, even though, the characteristics of the electrooptic materials themselves may not be linear as a function of the applied bias. The linear, reciprocal nature of such couplers in turn means that the characteristics of transmission between the ports does not depend upon the direction of transmission. In turn, this means that input and output ports may be freely interchanged. However, in order to explain the operation of the couplers, it is necessary to talk about "input" and "output" signals, but these terms should be understood in the context of reciprocity.

Figure 3A:
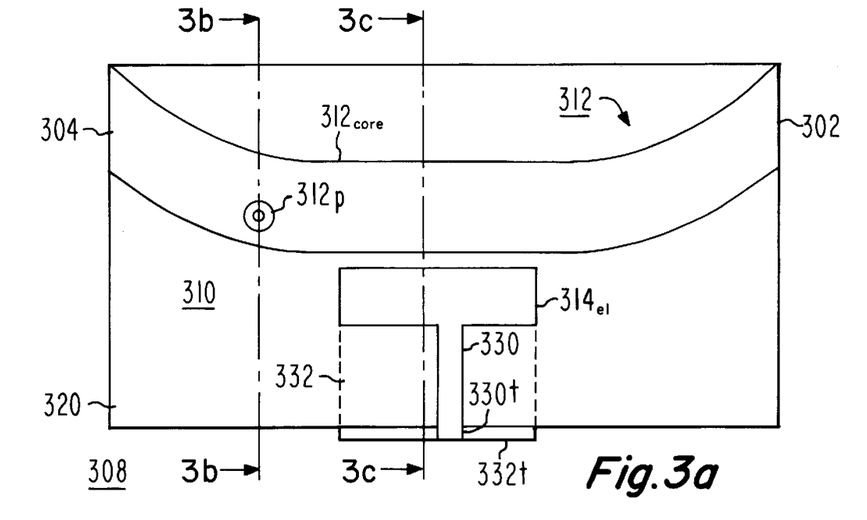
FIG. 3a is a simplified plan view of a portion of a planar microchip on which an optical modulator is formed by multilayer batch processing.
Figure 3B:
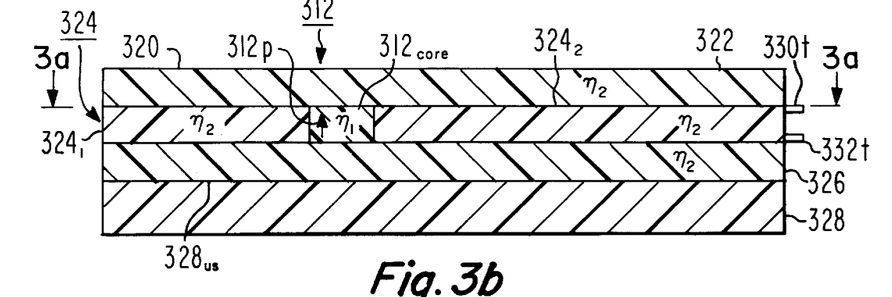
FIGS. 3b and 3c are cross-sections of the microchip of FIG. 3a looking in the direction of section lines 3b—3b and 3c—3c, respectively.
Figure 3C:
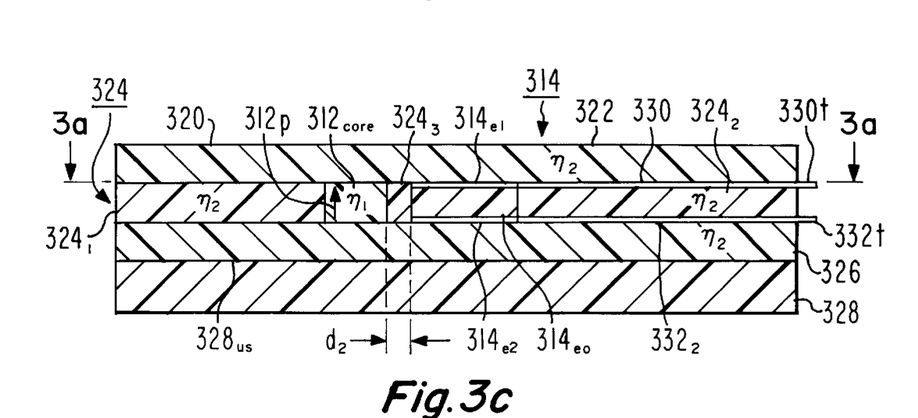

FIG. 3a is a simplified plan view of a portion of a microchip 308 on which a planar optical modulator 310 is formed by multilayer batch processing, as further described below. The optical modulator includes an optical transmission line 312 and the metallization $314_{e1}$ of an electrooptic control element $314_{e0}$ (visible in FIG. 3c). FIGS. 3b and 3c are cross-sections of the microchip of FIG. 3a looking in the direction of section lines 3b—3b and 3c—3c, respectively. FIG. 3b illustrates the core $312_{core}$ of optical waveguide 312, and FIG. 3c illustrates both core $312_{core}$ and electrooptic element $314_{e0}$. The microchip 308 of FIGS. 3a, 3b, and 3c is formed or defined on the upper surface $328_{us}$ of a support substrate 328, which may be of dielectric material or metallic material, and which may be transparent or opaque. For ease of explanation, optical "ports" 302 and 304 are defined at the ends of waveguide 312, but these ports may not actually exist in an actual microchip, as the waveguides will ordinarily connect to other components; only the waveguide which receives light from, or delivers light to the outside world will have an actual light port. The preferred material for substrate 328 is a dielectric material thermally matched in coefficient of expansion to the polymer. A layer 326 of transparent polymeric cladding material is deposited on upper surface $328_{us}$ of substrate layer 328. The index of refraction of cladding layer 326 is selected to be, or defined, as $\eta_2$. A further layer of polymeric cladding material 324 having index of refraction $\eta_2$ overlies at least portions of cladding layer 326; in FIG. 3b, the polymeric layer designated 324 extends completely across the upper surface $328_{us}$ except in the location of core $312_{core}$, which thereby divides layer 324 into two portions designated $324_1$ and $324_2$. In FIG. 3c, the polymeric layer 324 extends completely across upper surface $328_{us}$, except in the locations occupied by core $312_{core}$ and electrooptic element $314_{e0}$. Layer 324 is divided by the presence of the core and the electrooptic element $314_{e0}$ into three portions $324_1$, $324_2$, and $324_3$, where the thickness or width of layer $324_3$ is indicated as being $d_2$. The thickness or width of layer $324_3$ is selected to provide the proper amount of evanescent coupling between core $312_{core}$ and the electrooptic element 314. The proper amount of coupling is initially established by experimentation, using as starting points or guides the desired amount of coupling and the dimensions known from prior-art couplers, and then simply repeating the ideal dimensions for all subsequent microcircuits. The cladding material of layer 324 is made from the same transparent polymeric cladding material as layer 326; as described below, the material of layer 324 is loaded with a radiation-responsive material, such as acrylic-based monomers in a polymeric binder matrix of cellulose acetate butyrate, sold by DuPont under the name POLYGUIDE, in order to allow definition of core $312_{core}$. This material is responsive to UV to blue light to change index of refraction. In order to define the core 312core of the waveguide 312, layer 324 is masked, except in the region in which the core is to be defined, and then exposed to blue or UV light, which then defines the core $312_{core}$. Core $312_{core}$ has an index of refraction $\eta_1$, which is larger than index of refraction $\eta_2$.

Other ways to fabricate polymer waveguides are described in an article entitled "Polymers for Integrated Optical Waveguides" by Bruce L. Booth, published in *Polymers for Electronic and Photonic applications*, 1993 Bell Labs, ISBN 0-12-762540-2.

The microptic circuit 308 of FIGS. 3a, 3b, and 3c has a further layer of polymeric cladding 322 overlying layer 324. The further polymeric cladding layer 322 has index of refraction $\eta_2$. Thus, polymeric core $312_{core}$, with index of refraction $\eta_1$, is surrounded by polymeric cladding material of layers 322, 324, and 326, having index of refraction $\eta_2$, where $\eta_1$ is greater than $\eta_2$, except in the region of the electrooptic element. In the region of the electrooptic element $314_{e0}$, as illustrated in FIG. 3c, the polymeric core $312_{core}$, with index of refraction $\eta_1$, is surrounded by polymeric cladding material of layers 322, 324, and 326, except that the interstitial portion $324_3$ of polymeric cladding material 324 lying between core $312_{core}$ and electrooptic element $314_{e0}$ is thin enough so that the electrooptic element is evanescently coupled to the electrooptic element. The thickness of this interstitial material may be, for example, on the order of one micron.

Electrooptic element $314_{e0}$ of FIG. 3c has a pair of transparent, electrically conductive electrodes $314_{e1}$ and $314_{e2}$ affixed to its top and bottom surfaces, respectively. Electrodes $314_{e1}$ and $314_{e2}$ make electrical contact by way of electrically conductive (but not necessarily transparent) layers 330 and 332, respectively, with exposed electrical tabs 330t and 332t, respectively, so that a bias voltage can be applied across electrodes $314_{e1}$ and $314_{e2}$, to control the index of refraction of the electrooptic element 314. As can be seen in FIG. 3a, electrode 332 may have a substantial lateral or transverse dimension, and electrode 330 a lesser transverse dimension, so that their combination makes a structure similar to a microstrip transmission line, capable of carrying radio-frequency (RF) signals. As is known to those skilled in the art, the term RF at one time referred to frequencies up to a few hundred kilohertz (KHz), but now refers to frequencies, including microwave- and millimeter-wave frequencies, to just below the lower light frequencies. In general, the term RF does not, at least at present, include infrared frequencies. It should be noted that the dimensions illustrated for the electrooptic element in FIGS. 3a and 3c are larger relative to the dimension of the waveguide core for purposes of explanation; ordinarily, the control element will have a width on the same order as that of the core.

In operation of the modulator of FIGS. 3a, 3b, and 3c, light, which is linearly polarized in the vertical direction in FIGS. 3b and 3c, is propagated in the optical waveguide 312. The system is bidirectional, in that it makes no difference whether light is applied to port 302 or 304. The polarization of the light is represented in FIG. 3a by a circle and dot designated 312P, representing the end of an arrowhead, and the corresponding arrow is represented in FIGS. 3b and 3c; those skilled in the art recognize that this representation is instantaneous, in that the polarization will remain in the same plane, but will reverse direction at a frequency established by the wavelength of the light. A bias voltage is applied across tabs 330t and 332t from a controllable source, such as the source 16 of FIG. 1, creating an electric field within the electrooptic element $314_{e0}$ which lies parallel to the electric field vector of the light wave or light signal propagating in waveguide 312 (parallel polarization). The parallel polarization may be of either polarity (with the arrowheads of the two fields in the same or in the opposite directions), because the characteristics of the electrooptic materials do not generally depend on the polarity (relationship of positive to negative pole) of the applied voltage; in those cases in which the electrooptic materials do have such an unsymmetric dielectric behavior, the appropriate polarity of the voltage should be used. The magnitude of the voltage is selected to place the electrooptic material $314_{e0}$ in one of first and second extreme states, or in a state intermediate the first and second states. In the first state, the electrooptic material $314_{e0}$ exhibits an index of refraction which lies in a range which is less than the index of refraction of the core $312_{core}$, and in the second state, the electrooptic material $314_{e0}$ exhibits an index of refraction which lies in a range which is equal to or greater (higher) than the index of refraction of the core $312_{core}$. More particularly, the index of refraction should be set in the second state so that appropriate mode matching occurs between the modes of waveguide 312 and the electrooptic material for the desired amount coupling.

Figure 4A:
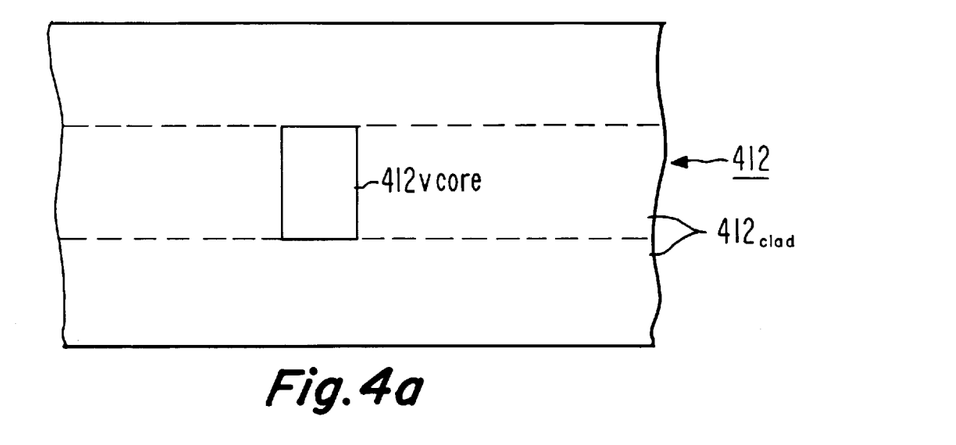
FIGS. 4a and 4b illustrate simplified cross-sections of waveguides which are arranged for propagation of vertically- and horizontally-polarized signals, respectively.
Figure 4B:
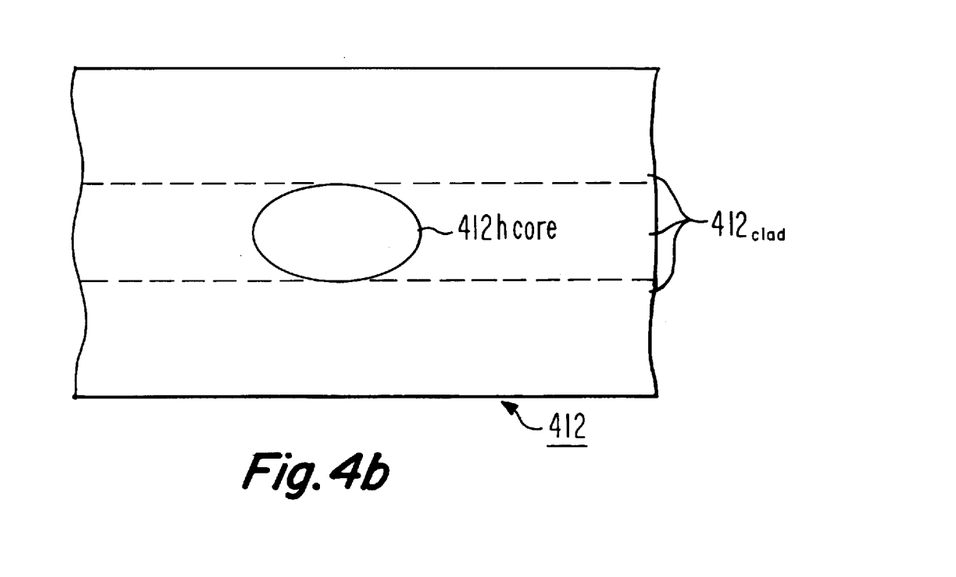

FIGS. 4a and 4b illustrate simplified cross-sections of waveguides 412v and 412h, which are arranged for propagation of vertically- and horizontally-polarized signals, respectively. More particularly, waveguide 412v includes a core 412vcore which is elongated in the vertical direction, while core 412hcore of waveguide 412h is elongated in the horizontal direction, both surrounded by cladding $412_{clad}$. The polarization tends to maintain itself parallel to the longer dimension of the core. To show that the exact shape of the core doesn't particularly matter, core 412vcore is illustrated as being rectangular, while core 412hcore is illustrated as being elliptical. Thus, while it would be desirable to provide an elliptical shape for lowest loss, a rectangular shape suffices.

While the structure 308 depicted in FIGS. 3a, 3b, and 3c appears to be a rectangular "box," its thickness is very small relative to its length and width, or surface area, just as an electronic microchip is essentially planar, although it may include many layers of structure. With this meaning, the arrangement of FIGS. 3a, 3b, and 3c can be termed "planar." The planar arrangement of FIGS. 3a, 3b, and 3c can be made by the use of photolithography, as described below, which at the current state of the art provides tolerances of better than one micron. These tolerances, and the batch processing possible using photolithographic techniques, allow planar structures, functionally equivalent to the prior-art structures of FIGS. 1 and 2, to be fabricated in a batch manner, with better yield and more tightly controlled characteristics, than the prior-art structures. Also, as described below, it makes possible the placement of many interconnected modulators, switches, or both, on a single optical microchip, thus simultaneously reducing the cost of the structure, and enhancing its useful complexity or interactions. When it is considered that a modulator may be thought of as an amplifier, it becomes clear that, in principle, the described structure is capable of performing many of the functions currently performed by electronic integrated circuits, with the advantages of photonic circuits.

Figure 5A:
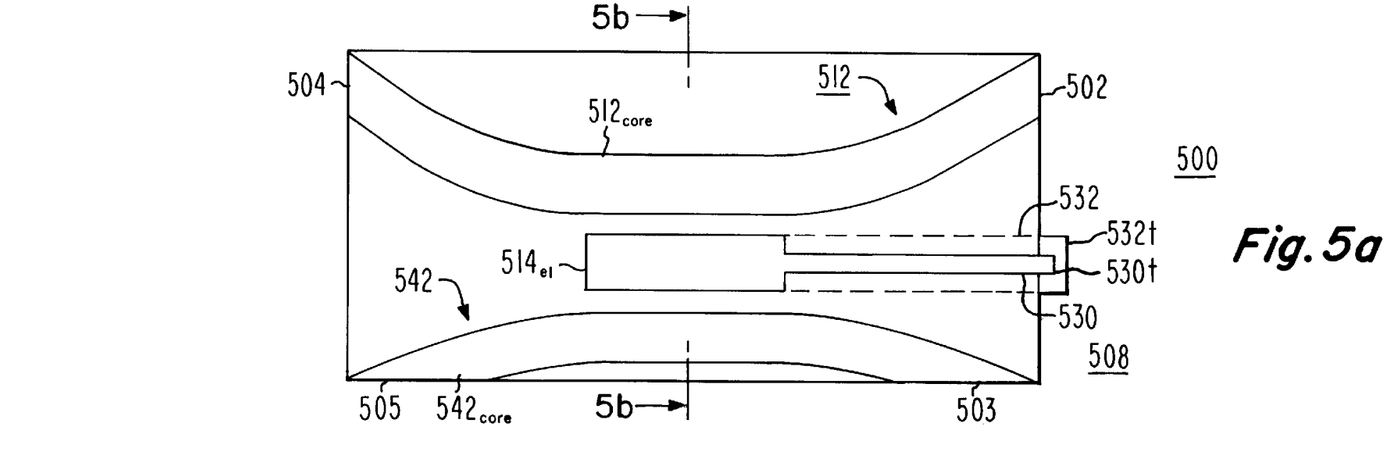
FIG. 5a is a simplified plan view which illustrates a portion of a planar microchip on which an electrically biased optical switch is formed or defined according to an aspect of the invention.
Figure 5B:
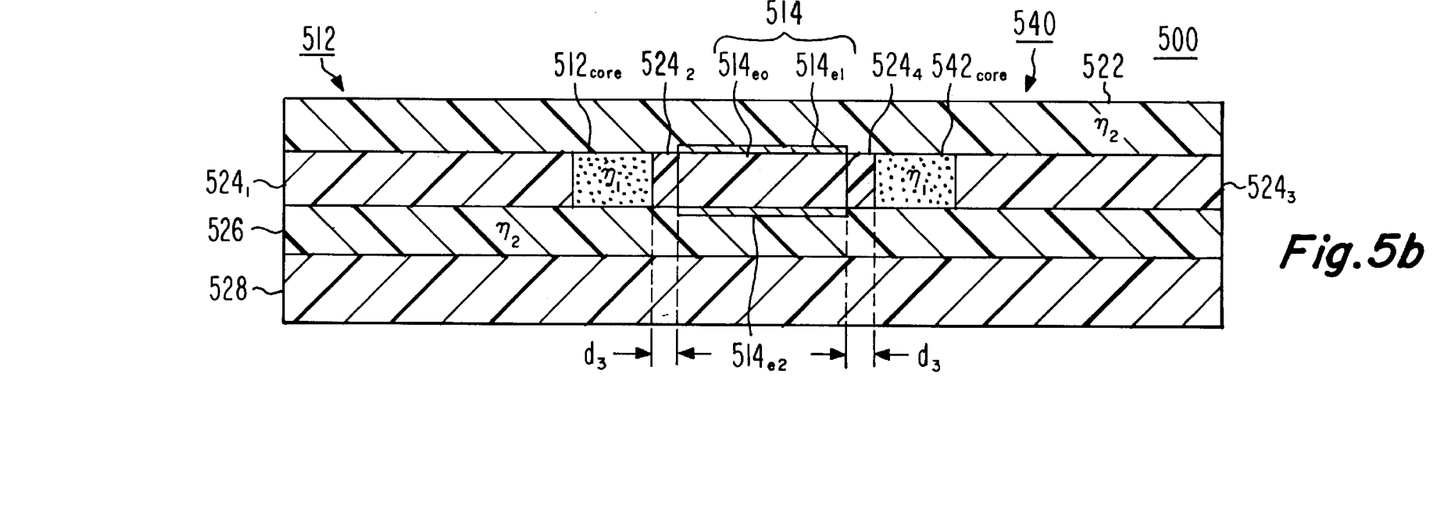
FIG. 5b illustrates a cross-section thereof looking in the direction of section lines 5b—5b.

FIG. 5a is a simplified plan view which illustrates an optical switch 500 according to an aspect of the invention, and FIG. 5b illustrates a cross-section thereof along the section lines 5b—5b. In FIGS. 5a and 5b, elements corresponding to those of FIGS. 3a, 3b, and 3c are identified by the same reference numerals, but in the 500 series rather than in the 300 series. The arrangement of FIGS. 5a and 5b represents a polymeric optical waveguide 512 having a core $512_{core}$ and a polymeric optical second waveguide 542 having a core 542core, each spaced by an interstitial distance $d_3$ from an electrooptic control element 514, where $d_3$ is selected to provide evanescent coupling between each waveguide 512, 542 and control element 514. Optical waveguide 512 defines ports 502 and 504, while waveguide 542 defines ports 503 and 505. The cross-section of FIG. 5b shows that the structure of the planar optical assembly or chip 508 is similar to that of assembly or chip 308 of FIGS. 3a, 3b, and 3c, except that the second layer 524 of polymeric cladding material is separated into four sections, rather than three, by the presence of first and second waveguides 512, 542, and the electrooptic control element 514. The four portions of cladding material are designated $524_1$, $524_2$, $524_3$, and $524_4$ in FIG. 5b. As in the case of the structure of FIGS. 3a, 3b, and 3c, the optical waveguides and the electrooptic element 514 are surrounded top and bottom by polymeric cladding layers 522 and 526, and by those portions of further polymeric layer 524. The electrooptic portion $514_{e0}$ of control element 514 of FIG. 5b has electrically conductive electrode layers $514_{e1}$ and $514_{e2}$ coupled to its top and bottom surfaces, respectively. Electrodes $514_{e1}$ and $514_{e2}$ connect by way of electrically conductive paths 530, 532 to tabs or contacts 530t and 532t, respectively, so that electrical bias can be applied to the electrooptic control element 514.

In operation of the switch of FIGS. 5a and 5b, light may be applied to any port 502, 503, 504, or 505. Light applied to any port propagates along the associated optical waveguide into the interaction region adjacent electrooptic control element 514. If the electrooptic material is in its low-index-of-refraction or first state, the light continues to propagate along the same waveguide to its other port. For example, if light is applied to port 502 when the electrooptic element is in its first state, "no" light is coupled to waveguide 542, and all the light flows from port 502 to port 504 by way of waveguide 512. Similarly, light applied to port 504 when the electrooptic element is in its first state continues to propagate, without substantial loss, to port 502. By symmetry, light applied to either of ports 503 or 505 when the electrooptic element is in the first state flows to ports 505 or 503, respectively. When the electrooptic material of control element 514 is in its second or high-index-or-refraction state, or more properly when its index of refraction is matched to that of the cores $512_{core}$ and 514core, light applied to port 502 is coupled to port 505, and light coupled to port 505 is coupled to port 502. Similarly, light applied to port 504 is coupled to port 503, and light applied to port 503 is coupled to port 504. Thus, the structure of FIGS. 5a and 5b may be used as a single-pole, double-throw light switch, since light applied to port 502 can exit from port 504 or 505. Of course, those skilled in the art know that some through losses are unavoidable, and that some leakage will occur even in the OFF state of a switch.

Figure 6A:
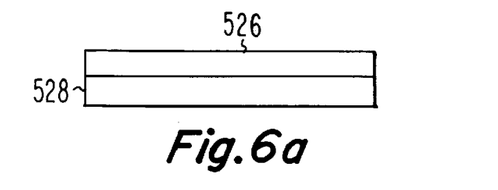
FIGS. 6a, 6b, 6c, 6d, 6e, and 6f are simplified illustrations which represent steps in the fabrication of a structure such as that illustrated in FIGS. 5a and 5b.
Figure 6B:
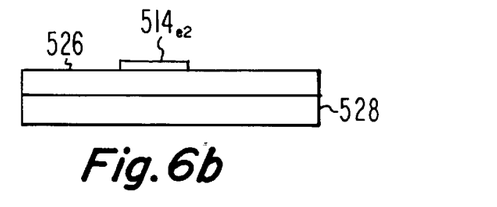
Figure 6C:
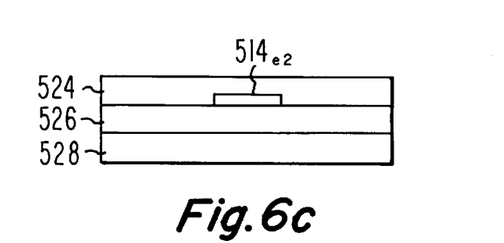
Figure 6D:
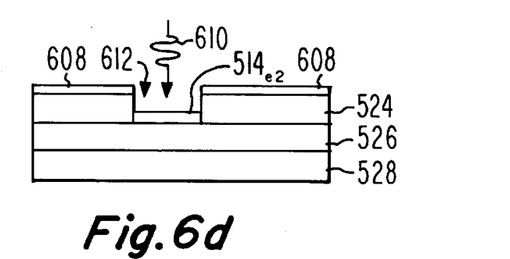

FIGS. 6a, 6b, 6c, 6d, 6e, and 6f represent steps in generating a structure such as that illustrated in FIGS. 5a and 5b. In FIG. 6a, a substrate 528 is coated with polymeric cladding material 526, as by spinning or lamination, and cure. Substrates may be purchased in this condition. FIG. 6b represents the result of masking, followed by deposition of electrically conductive material $514_{e2}$, and then by removal of the mask. The electrically conductive material should be transparent in the physical region in which the electrooptic element will be placed, and may be opaque in other regions. A second layer of polymeric cladding material 524 is applied over layer 526 and metallization $514_{e2}$, as illustrated in FIG. 6c. Polymeric cladding layer 524 contains radiation-responsive substance, such as that described above in conjunction with the DuPont POLYGUIDE material, which effectively changes the index of refraction in the irradiated portion, as described in the chapter headed Polymers for Integrated Optical Waveguides, by Bruce L. Booth, in the text *POLYMERS FOR ELECTRONIC AND PHOTONIC APPLICATIONS*, ISBN 0-12-762540-2 (1990). Following the step of FIG. 6c, a mask 608 is applied to the upper surface of layer 524, leaving an aperture at the location of the electrooptic element, as illustrated in FIG. 6d, and radiation illustrated as 612 from an excimer laser (a laser which emits ultraviolet radiation) is applied through the aperture in the mask, to etch away or ablate the material of layer 524 to form a pit or cavity 612, which will ultimately accommodate the electrooptic material. The metallic layer $514_{e2}$ may aid in avoiding excessive ablation of layer 526.

Figure 6E:
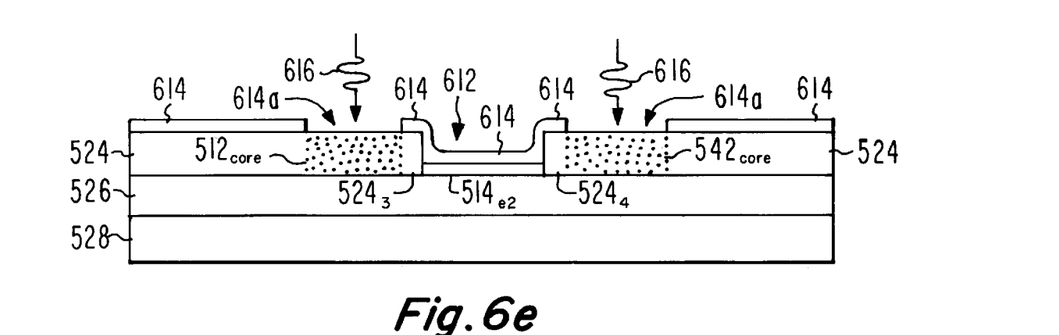
Figure 6F:
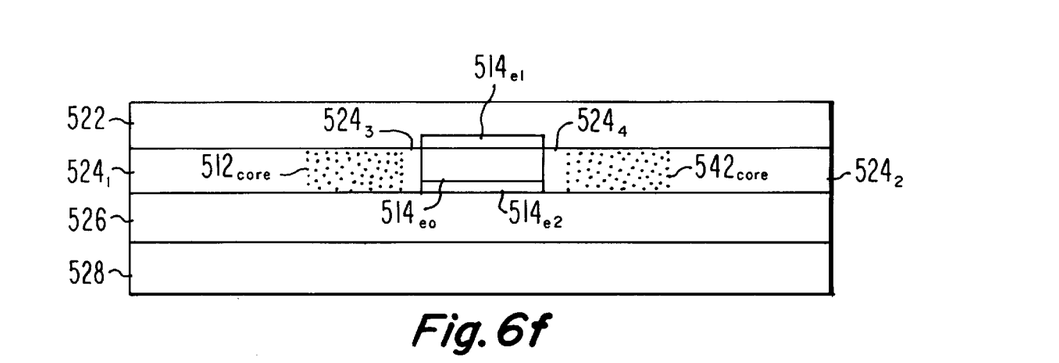

Following the step of FIG. 6d, the mask 608 is removed, and a further mask 614 is applied as illustrated in FIG. 6e, exposing by apertures 614a those regions in which the cores of the optical waveguides are to be defined. Radiation, illustrated by photon symbols 616, is applied through the apertures 614a in mask 614, to change the characteristics of the cladding polymer 524 in the regions $512_{core}$ and 542core. The region of layer 524 with changed characteristics is illustrated by dappling. As illustrated in FIG. 6e, the dappled regions are separated from the pit or cavity 612 by thin portions $524_3$ and $524_4$ of polymeric cladding material with unchanged characteristics, as a result of the presence of mask 614. Mask 614 is then removed.

Following the steps illustrated in conjunction with FIG. 6e, a further mask is applied, exposing pit 612, and the electrooptic material $514_{e0}$ is applied by evaporation or by the shear method, as described in *Nonlinear optical studies of single crystal films of N-(4-nitrophenyl)-L-prolinol*, by Quintero-Torres et al., published at pp 1994–1996 of Appl. Phys. Lett. 69(14), Sep. 30, 1996, and in *Measurement of electro-optic effects in single crystal film of N-(4-nitrophenyl)-L-prolinol*, by Xu et al., published at pp 1197–1198 of Appl. Phys. Lett., vol 69, 26 Aug. 1996. DAST can be applied in the same manner. The mask used for deposition of the electrooptic material is removed (or it may be used in the next step). The following step includes applying transparent electrically conductive electrodes $514_{e1}$, of a material such as ITO, over the electrooptic material $514_{e0}$. The mask is then removed, and another mask is used to define the locations for the nontransparent electrical conductors (not illustrated in FIGS. 6a–6f, where the hyphen is representative of the word "through"). Finally, a further layer 522 of polymeric cladding material is applied over layer 524 and over electrode $514_{e1}$, to complete the structure.

Figures 7, 8:
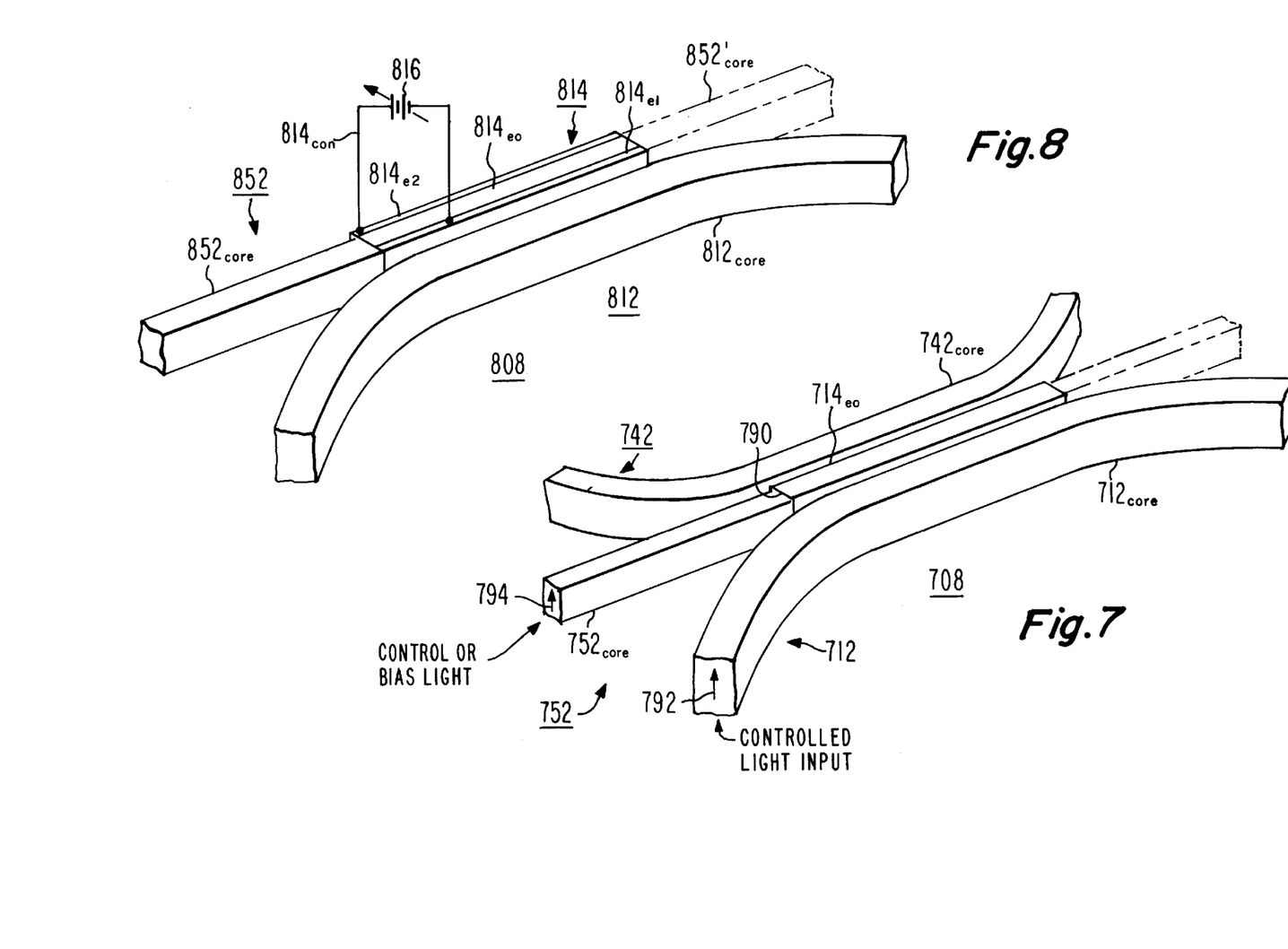
FIG. 7 is a simplified perspective or isometric view of a portion of an optical switch according to an aspect of the invention, which is operated by bias light.
FIG. 8 is a simplified perspective or isometric view of a light switch in accordance with an aspect of the invention, in which a lead-in or lead-out light waveguide is coupled to an electrically-biased electrooptic element.

FIG. 7 is a simplified perspective or isometric view of a portion of an optical switch 708 according to an aspect of the invention. In FIG. 7, the square core $712_{core}$ of a first optical waveguide 712 is illustrated as having a curved region and a relatively straight interaction region, much as in the structures of FIGS. 3a, 3b, 3c, and 5a, 5b. The surrounding cladding material is not illustrated in FIG. 7. The straight interaction region of core $712_{core}$ lies parallel to a similar straight interaction region of a square core $742_{core}$ of a second optical waveguide 742. An electrooptic control element $714_{e0}$ is spaced away from cores $712_{core}$ and $742_{core}$ in the interaction region by small gaps, sufficient for evanescent coupling. Naturally, the cladding materials must surround the cores, as described previously. In the arrangement of FIG. 7, no electrically conductive electrodes are coupled to electrooptic element $714_{e0}$. Instead, a further waveguide core $752_{core}$, which may be a continuation of the electrooptic material, or which may be made from the loaded cladding material in the same manner as the cores $712_{core}$ and $742_{core}$, couples a control light signal into the electrooptic element $714_{e0}$. If the core $752_{core}$ of waveguide 752 is not made from electrooptic material, a transition to the electrooptic material must be made, as for example by a multistep or graded transition illustrated as a junction 790. As mentioned above, the electric field produced by the bias is preferably parallel to the electric field of the light signal being controlled. Consequently, when the light input is vertically polarized as suggested by arrow 792 of FIG. 7, the bias light 794 should also be vertically polarized. In the case of cores of square cross-section as illustrated in FIG. 7, the input light to be controlled can be horizontally polarized, in which case the controlling or bias light signal should also be horizontally polarized for most effective use of at least some types of electrooptic material. In the arrangement of FIG. 7, the "first" and "second" waveguides 712 and 742 are evanescently coupled to the electrooptic element 714, but "third" waveguide 752 is directly coupled.

FIG. 8 is a simplified perspective or isometric view of a light switch 808 in accordance with an aspect of the invention, in which a lead-in or lead-out light waveguide is directly coupled to an electrically-biased electrooptic element. As in FIG. 7, the illustration in FIG. 8 does not illustrated the cladding material. In FIG. 8, the core $812_{core}$ of a first polymeric optical waveguide 812 has a straight portion in which the interaction with an electrooptic element 814 takes place. As in the other embodiments of the invention, the electrooptic element is evanescently coupled to light waveguide 812 by appropriate spacing by cladding material (not illustrated). As in the arrangement of FIG. 7, the electrooptic element 814 includes an electrooptic slab $814_{e0}$, which is coupled to a polymeric (or possibly electrooptic) waveguide 852 having a core $852_{core}$. The arrangement of FIG. 8 differs from that of FIG. 7 in that the electrooptic element 814 is controlled by electrical bias applied from a controllable voltage source, illustrated by a variable battery symbol 816, to electrode $814_{e2}$ and transparent electrode $814_{e1}$. As described in conjunction with FIGS. 3a, 3b, and 3c, the bias controls the amount of light coupled between waveguide 812 and electrooptic control element 814. In the case of the arrangement of the modulator of FIGS. 3a, 3b, and 3c, the light entering the electrooptic material from the light waveguide was lost. In the arrangement of FIG. 8, the light coupled into the electrooptic element is led out by way of light waveguide 852.

Figure 9:
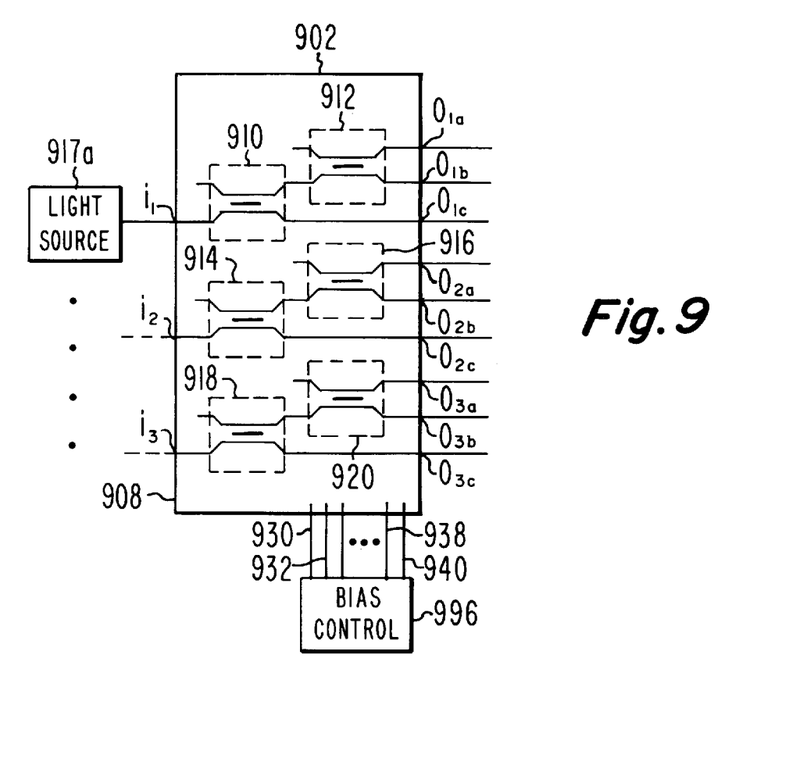
FIG. 9 is a simplified plan view of a schematically-represented microphotonic circuit according to an aspect of the invention, operated as a redundancy switch, in which a plurality of switches corresponding to either the electrically biased switch of FIGS. 5a and 5b or to the light-biased switch of FIG. 7 or FIG. 8 are used.

FIG. 9 is a simplified plan view of a schematically-represented optical microcircuit or microphotonic circuit 908 according to an aspect of the invention, in which a plurality of active devices are used. The active devices are in the form of switches corresponding to either the electrically biased switch 500 of FIGS. 5a and 5b or to the light-biased switch 708 of FIG. 7. In FIG. 9, a planar chip 902 bears six active devices or controllable switches 910, 912, 914, 916, 918, and 920. Planar chip 902 has a plurality of light input ports, some of which are designated $i_1$, $i_2$, and $i_3$, and a plurality of light output ports, which are grouped in threes. The first group of three is designated $O_{1a}$, $O_{1a}$, and $O_{1c}$. The second group of three is designated $O_{2a}$, $O_{2a}$, and $O_{2c}$, and the third group is designated $O_{3a}$, $O_{3a}$, and $O_{3c}$. Other groups of output ports, not illustrated, may also be associated with chip 902. Input port $i_1$ is connected by way of an on-chip polymer waveguide to an input port of switch 910, which may correspond, for example, to port 502 of switch 500 of FIG. 5. An additional port of switch 910, which may correspond, for example, to switch port 504 of switch 500, is connected to chip 902 output port $O_{1c}$. Another light port of switch 910 of FIG. 9, which may, for example, correspond to switch port 505 of switch 500 of FIG. 5, is connected to a light port (corresponding to light port 502 of switch 500) of switch 912. The two output ports of switch 912 of FIG. 9 which correspond to switch ports 504 and 505 of switch 500 of FIG. 5 are connected to chip 902 ports $O_{1a}$ and $O_{1b}$, respectively. Thus, bias-controlled light switches 910 and 912 are interconnected, with an input light signal being received at light input port $i_1$ from light source 917a, and with the light being transmitted by way of switch 910 alone (in one bias condition of switch 910) directly to output port $O_{1c}$, and with the light, in the other bias condition of switch 910, being routed to switch 912, which in turn routes the light signal to either port $O_{1a}$ or port $O_{1b}$, depending upon the bias condition of light switch 912.

Thus, selecting the bias condition of switch 910 of FIG. 9 to the "through" coupling condition results in coupling light from input port $i_1$ to output port $O_{1c}$ regardless of the bias state of switch 912. Selection of the bias condition of switch 910 to the "coupled" condition, together with biasing of switch 912 to the coupled condition, results in routing light from input port $i_1$ to output port $O_{1a}$. Selection of the bias condition of switch 910 to the "coupled" condition, together with biasing of switch 912 to the through condition, results in routing light from input port $i_1$ to output port $O_{1b}$. A bias control arrangement is illustrated in FIG. 9 as a block 996. Bias control 996 produces bias signals as either electrical signals or light signals, depending upon whether the switches 910–920 of FIG. 9 are electrically-controlled as described in conjunction with FIGS. 5a and 5b, or light-controlled as described in FIG. 7. The bias signals are coupled from bias source 996 to chip 912 by way of a set of signal paths, including paths designated 930, 932, 938, and 940.

Planar chip 912 of FIG. 9 has the remaining light switches 914–920 connected in pairs in the same manner that the switch pair 910, 912 is connected. Thus, switch pair 914, 916 controls the light transmission between input port $i_2$ and output ports $O_{2a}$, $O_{2b}$, and $O_{2c}$, and switch pair 918, 920 controls the light transmission between input port $i_3$ and output ports $O_{3a}$, $O_{3b}$, and $O_{3c}$. Thus, a simple controller, well within the state of the art, allows each pair of light switches to control the transmission of light between an input port and three output ports. Those skilled in the art will recognize that the chip may be used as a redundancy switch, and that the number of output terminals can be as large as desired, subject only to limitations such as the cost of the chip and the losses between ports. Also, those skilled in the art will recognize that a cascade of light switches such as the pairs described in conjunction with FIG. 9 is bidirectional, so it can be used as a one-to-many connection, or a many-to-one selection connection.

Figure 10:
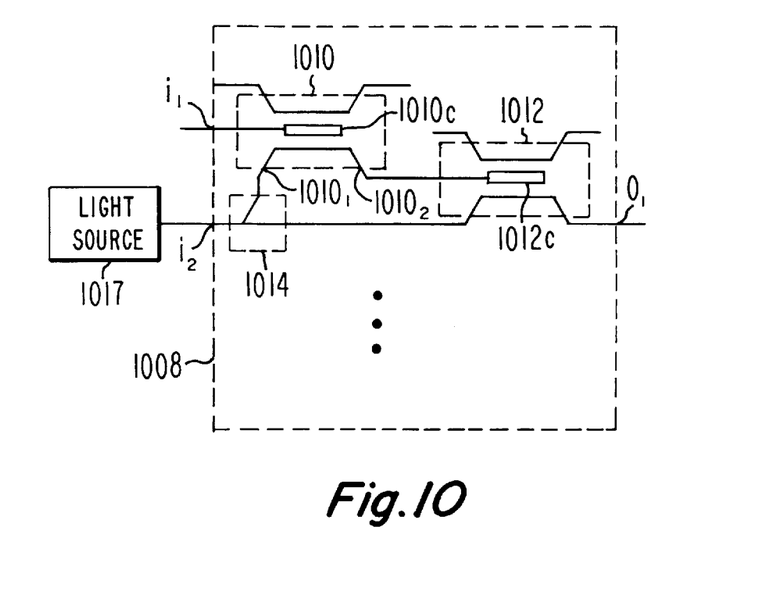
FIG. 10 is simplified diagram of another embodiment of the invention, in which of light-controlled modulators or switches can perform amplification.

FIG. 10 is a simplified diagram of another embodiment of the invention, in which multiple stages of active devices in the form of light-controlled modulators or switches can perform amplification. In FIG. 10, a portion of a photonic microcircuit is illustrated as 1008. Microcircuit 1008 includes two modulators designated 1010 and 1012. Modulator 1010 has a signal light input port $i_1$, which couples to its control element 1010c. Microcircuit 1008 is also provided with "high power" light from a source 1017, which provides the same function to photonic microcircuit 1008 as a voltage source does to a conventional electronic microcircuit; it provides the energy for amplification. The light source 1017 applies the energizing light by an input port $1_2$ to a splitter 1014, which splits off a portion of the energizing light, and applies the split-off portion to an input port $1010_1$ of modulator 1010. The energizing light applied by way of input port $1010_1$ to modulator 1010 is modulated by a light signal applied by way of input port $i_1$ to control element 1010c of modulator 1010 of microcircuit 1008, with the result that the higher-energy or higher-power light signal is controlled, and appears at output port $1010_2$. The control of a higher-energy signal amounts to amplification. The amplified light signal is applied from port $1010_2$ of 1010 to the electrooptic control element 1012c of modulator 1012, where the energizing light from splitter 1014 is again controlled. The amount of control provided by control element 1012c is greater than that provided by control element 1010c, because of the greater light signal amplitude applied thereto as bias. Thus, the arrangement of FIG. 10 is of a part of a photonic microchip including a multistage amplifier, with an input light signal applied to input port $i_1$, an amplified light signal produced at output port $O_1$, and with the energizing energy provided by light from a source 1017 applied to an input port $i_2$. A microphotonic circuit such as 1008 may include vast numbers of photonic circuits, because of the simple batch fabrication which is possible with the described structure, and the photonic circuits may take on any level of complexity which may be desired.

For the electooptic materials of which the inventors are aware, the optimum polarization condition is when the electric field vectors of the light are aligned with the electric field vectors of the bias, and these two are in some particular orientation relative to the axes the structure of the material, which in the case of crystalline materials is relative to the axes of the crystal of the electrooptic material.

Thus, in one embodiment of the invention (FIGS. 3a, 3b, 3c; FIGS. 5a, 5b; FIG. 8), the electric field for control of the electrooptic element is generated by an electrical voltage source (16; 816), and in another embodiment (FIG. 7), it is generated by a control light source (996). According to an aspect of the invention, an optical assembly or optical device (308; 508; 708; 808; 908; 1008) comprises a planar optical polymer first waveguide arrangement (312; 512; 712; 812) for guiding light or a light signal having a selected linear polarization (312p) which may be vertical or horizontal, and lying within a range of wavelengths. The first waveguide arrangement (312; 512; 712; 812) includes an optical core ($312_{core}$; $512_{core}$; $712_{core}$; $812_{core}$) having an index of refraction ($\eta_1$) lying within a first range. At least one planar control element (314e0; 514e0; 714e0; $814_{e0}$) is evanescently coupled (separated by a spacing, generally in the micron range, of cladding-type material) to the core ($312_{core}$; $512_{core}$; $712_{core}$; $812_{core}$) of the first waveguide arrangement (312; 512; 712; 812), for, in a first state, exhibiting an index of refraction ($\eta_2$) which lies in a range which is less than the range of index of refraction of the core ($\eta_1$), and for, in a second state, exhibiting an index of refraction which lies in a range which is equal to or higher than the index of refraction of the core ($\eta_1$). The control element ($314_{e0}$; $514_{e0}$; $714_{e0}$; $814_{e0}$) is made from an electrooptic material ($LiNiO_3$; DAST) which has an index of refraction which is responsive to the amplitude of electric fields traversing the control element ($314_{e0}$; $514_{e0}$; $714_{e0}$; $814_{e0}$) A planar optical polymer second waveguide arrangement (542; 742; 752; 852) is coupled to the control element ($314_{e0}$; $514_{e0}$; $714_{e0}$; $814_{e0}$), for receiving or leading out that portion of an optical signal which passes from the first optical waveguide arrangement into (or through) the control element ($314_{e0}$; $514_{e0}$; $714_{e0}$; $814_{e0}$). The optical assembly (308; 508; 708; 808; 908; 1008) also includes provision (330t, 332t: 530t, 532t; 752; $i_1$; $814_{con}$; $i_2$) for accepting bias from an electric field generator (16; 816; 996, 1017) coupled to the control element ($314_{e0}$; $514_{e0}$; $714_{e0}$; $814_{e0}$), for generating, within the control element ($314_{e0}$; $514_{e0}$; $714_{e0}$; $814_{e0}$), an electric field parallel with the selected polarization (312p). The magnitude of the electric field generated by the electric field generator (16; 816; 996, 1017) is selected to place the control element ($314_{e0}$; $514_{e0}$; $714_{e0}$; $814_{e0}$) in at least one of the first and second states. In the first state of the material of the control element ($314_{e0}$; $514_{e0}$; $714_{e0}$; $814_{e0}$), optical signal in the first waveguide arrangement (312; 512; 712; 812) remains largely in the first waveguide arrangement (312; 512; 712; 812), and in the second state of the material of the control element ($314_{e0}$; $514_{e0}$; $714_{e0}$; $814_{e0}$), at least some of the optical signal flowing in the first waveguide arrangement (312; 512; 712; 812) is coupled to the second waveguide arrangement (542; 742; 752; 852).

In one embodiment of the invention, the second waveguide arrangement (542; 742) is evanescently coupled (separated by a spacing, generally in the micron range, of cladding-type material) to the control element ($514_{e0}$; $714_{e0}$) The first (312; 512; 712; 812) and second (542; 742; 752; 852) waveguide arrangements are preferably polarization-maintaining waveguide arrangements, each operating in single-mode fashion. In another embodiment of the invention, the electric field coupling arrangement comprises first ($314_{e1}$; $514_{e1}$; $814_{e1}$) and second ($314_{e2}$; $514_{e2}$; $814_{e2}$) transparent, electrically conducting electrodes in electrical contact with different portions of the control element ($314_{e0}$; $514_{e0}$; $714_{e0}$; $814_{e0}$) together with a source of bias voltage (16, 816) and an electrical coupler (330, 332; 530, 532; $814_{con}$) coupled to the source of bias voltage (16, 816) and to the first ($314_{e1}$; $514_{e1}$; $814_{e1}$) and second ($314_{e2}$; $514_{e2}$; $814_{e2}$) transparent, electrically conducting electrodes, for applying the bias voltage across the first ($314_{e1}$; $514_{e1}$; $814_{e1}$) and second ($314_{e2}$; $514_{e2}$; $814_{e2}$) electrodes. This results in a bias electric field which extends between the first and second electrodes. The transparent, electrically conducting electrodes may be of indium tin oxide. The electrical coupler (330, 332; 530, 532; $814_{con}$) may include opaque electrically conducting material, which may be of gold or gold alloy.

In another embodiment of the invention, the electric field coupling arrangement includes a source (917a; 1017) of bias light, and the second waveguide arrangement (542; 742; 752; 852) is coupled to the source of light. The second waveguide arrangement (542; 742; 752; 852) is directly coupled to the control element ($314_{e0}$; $514_{e0}$; $714_{e0}$; $814_{e0}$), for coupling bias light to the control element ($314_{e0}$; $514_{e0}$; $714_{e0}$; $814_{e0}$), for thereby establishing the electric field. In this embodiment, the second waveguide arrangement (542; 742; 752; 852) arrangement further includes a waveguide portion which is substantially free of electrooptic effects, and a waveguide transition for coupling the waveguide portion of the second waveguide arrangement (542; 742; 752; 852) to the control element ($314_{e0}$; $514_{e0}$; $714_{e0}$; $814_{e0}$) in a manner which tends to reduce reflections of light from the control element ($314_{e0}$; $514_{e0}$; $714_{e0}$; $814_{e0}$) toward the source of bias light.

In yet another embodiment of the invention, the electric field generator includes a source of bias light, and this embodiment further includes a third waveguide arrangement which is coupled to the source of bias light and is also directly coupled to the control element ($314_{e0}$; $514_{e0}$; $714_{e0}$; $814_{e0}$), for coupling bias light to the control element ($314_{e0}$; $514_{e0}$; $714_{e0}$; $814_{e0}$), for thereby establishing the electric field. This third waveguide arrangement may be substantially free from electrooptic effects, and may be coupled to the control element ($314_{e0}$; $514_{e0}$; $714_{e0}$; $814_{e0}$) by a tapered (graded index) transition.

A microchip (908; 1008) according to the invention includes a plurality of active devices such as controllable optical switches or amplifiers, in which the input port of one active device is coupled by a planar polymeric optical waveguide to the output port of another active device.

Other embodiments of the invention will be apparent to those skilled in the art. For example, while the optical waveguides have not been otherwise described, the preferred type is single-mode, for least loss and optimal coupling. The linear polarization is preferably vertical or horizontal relative to the planar structure of the optical assembly, but the linear polarization may be at skew angles, if desired. The fabrication step of spinning to obtain uniform thickness may instead be a squeegee type application. Instead of ablating with an excimer laser, any type of radiative, mechanical or chemical material removal technique may be used, so long as it is accurate enough to provide the proper dimensional tolerances. Any type of electrooptic material may be used other than $LiNiO_3$ or DAST. In particular, GaAs quantum-well structures show a change in index of refraction in response to bias voltage changes, and may be used for the electrooptic material. Instead of the crystalline electooptic materials described above, other electrooptic materials may be used, such as electrooptic polymers. While the cladding material has been described as being the same as the material of the waveguide core layers, there is no need for them to be the same, the minimum requirement is that the indices of refraction have the same relation as that described, and that the materials be compatible.

What is claimed is:

1. An optical assembly, comprising, a planar optical polymer first waveguide for guiding light having a selected linear polarization, and lying within a range of wavelengths, said first waveguide including an optical core having an index of refraction lying within a first range;

at least one planar control element evanescently coupled to said core of said first waveguide, for, in a first state, exhibiting an index of refraction which lies in a range which is less than said range of index of refraction of said core, and for, in a second state, exhibiting an index of refraction which lies in a range which is equal to or higher than said index of refraction of said core, said control element being made from a material which has an index of refraction which is responsive to the amplitude of electric fields traversing said control element;

a planar optical polymer second waveguide coupled to said control element for leading out that portion of an optical signal which passes from said first optical waveguide into said control element; and means for coupling an electric field to said control element, for producing, within said control element, an electric field parallel with said selected linear polarization, and of a magnitude selected to place said control element in at least one of said first and second states, whereby in said first state of said material of said control element, optical signal in said first waveguide remains largely in said first waveguide, and in said second state of said material of said control element, at least some of said optical signal flowing in said first waveguide is coupled to said second waveguide.

2. An assembly according to claim 1, wherein said second waveguide is evanescently coupled to said control element.

3. An assembly according to claim 2, wherein said means for coupling an electric field comprises;

first and second transparent, electrically conducting electrodes in electrical contact with different portions of said control element; and coupling means coupled to said first and second transparent, electrically conducting electrodes, and adapted to be coupled to a source of bias voltage, for applying said bias voltage across said first and second electrodes, whereby a bias electric field extends between said first and second electrodes.

4. An assembly according to claim 3, wherein said transparent, electrically conducting electrodes are indium tin oxide.

5. An assembly according to claim 2, wherein said means for coupling an electric field comprises:

a direct coupling of said second waveguide means to said control element; and means adapted for coupling said second waveguide means to a source of bias light, for coupling said bias light to said control element, for thereby establishing said electric field.

6. An assembly according to claim 5, wherein said second waveguide means further comprises a waveguide portion which is substantially free of electrooptic effects; and a waveguide transition for coupling said waveguide portion of said second waveguide means to said control element in a manner which tends to reduce reflections of light from said control element toward said source of bias light.

7. An assembly according to claim 1, wherein said first and second waveguides are polarization-maintaining waveguides.

8. An assembly according to claim 1, wherein:

said coupling means comprises opaque electrically conducting means.

9. An assembly according to claim 8, wherein said opaque electrically conducting means comprises gold.

10. An assembly according to claim 1, further comprising:

a source of bias light; and third waveguide means coupled to said source of bias light and directly coupled to said control element, for coupling said bias light to said control element, for thereby establishing said electric field.

11. An assembly according to claim 10, wherein said third waveguide means further comprises a waveguide portion which is substantially free of electrooptic effects; and a waveguide transition for coupling said third waveguide portion of said waveguide means to said control element in a manner which tends to reduce reflections of light from said control element toward said source of bias light.

12. An optical microchip, comprising, a first active device, said first active device including:

(a) a planar optical polymer first waveguide for guiding light having a selected linear polarization, and lying within a range of wavelengths, said first waveguide including a first port, a second port, and an optical core extending between said first and second ports, said optical core having an index of refraction lying within a first range;

(b) at least one planar control element evanescently coupled to said core of said first waveguide, for, in a first state, exhibiting an index of refraction which lies in a range which is less than said range of index of refraction of said core, and for, in a second state, exhibiting an index of refraction which lies in a range which is equal to or higher than said index of refraction of said core, said control element being made from a material which has an index of refraction which is responsive to the amplitude of electric fields traversing said control element;

(c) electric field coupling means coupled to said control element and adapted for being coupled to a source of bias in the form of an electric field, for generating, within said control element, an electric field parallel with said selected linear polarization, and of a magnitude selected to place said control element in at least one of said first and second states, whereby in said first state of said material of said control element, optical signal in said first waveguide remains largely in said first waveguide, and in said second state of said material of said control element, a significant amount of said optical signal is lost while flowing between said first and second ports of said first waveguide;

and a second active device, said second active device comprising:

(a) a planar optical polymer second waveguide for guiding light having said selected linear polarization, and lying within said range of wavelengths, said second waveguide including first and second ports, and an optical core extending between said first and second ports of said second waveguide, said optical core of said second active device having an index of refraction lying within a third range;

(b) at least a second planar control element evanescently coupled to said core of said second waveguide, for, in a first state, exhibiting an index of refraction which lies in a range which is less than said third range of index of refraction, and for, in a second state, exhibiting an index of refraction which lies in a range which is equal to or higher than said third range of index of refraction, said control element being made from a material which has an index of refraction which is responsive to the amplitude of electric fields traversing said control element; and a planar, polarization-maintaining polymeric third waveguide extending on said microchip from said second port of said first waveguide to one of (i) said first port of said second waveguide and (ii) said second planar control element, for processing light in the cascade of said first and second active devices.

13. A microchip according to claim 12, further comprising:

a planar optical polymer third waveguide coupled to said control element of said first active device, for leading out that portion of an optical signal which passes from said first optical waveguide into said control element of said first active device.

14. A microchip according to claim 12, wherein said one of said first port of said second waveguide and said second planar control element is said first port of said second waveguide.

15. A microchip according to claim 12, wherein said one of said first port of said second waveguide and said second planar control element is said second planar control element of said second waveguide.

* * * * *